United States Patent

Sato et al.

[11] Patent Number: 5,389,357
[45] Date of Patent: Feb. 14, 1995

[54] MODIFIED CRYSTALLINE ALUMINOSILICATE ZEOLITES AND PROCESS FOR THEIR PREPARATION

[75] Inventors: Goro Sato; Yusaku Arima; Takanori Ida, all of Kitakyushu, Japan

[73] Assignee: Catalysts & Chemicals Industries Co., Ltd., Tokyo, Japan

[21] Appl. No.: 252,375

[22] Filed: Jun. 1, 1994

Related U.S. Application Data

[63] Continuation of Ser. No. 965,479, Oct. 23, 1992, abandoned, which is a continuation-in-part of Ser. No. 680,465, Apr. 4, 1991, abandoned.

Foreign Application Priority Data

Apr. 11, 1990 [JP] Japan ................... 2-95570

[51] Int. Cl.$^6$ .................. C01B 33/34; B01J 29/08
[52] U.S. Cl. .................. 423/714; 423/715; 423/DIG. 21; 502/79; 502/85
[58] Field of Search ............ 423/328.2, 713, 714, 423/715, DIG. 21; 502/64, 79, 85

[56] References Cited

U.S. PATENT DOCUMENTS

| | | | |
|---|---|---|---|
| 3,506,400 | 4/1970 | Eberly, Jr. et al. | 23/182 |
| 3,691,099 | 9/1972 | Young | 423/714 |
| 3,929,672 | 12/1975 | Ward | 252/455 Z |
| 4,093,560 | 6/1978 | Kerr et al. | 252/455 Z |
| 4,503,023 | 3/1985 | Breck, deceased et al. | 423/328 |
| 4,610,856 | 9/1986 | Skeels et al. | 423/715 |
| 4,711,770 | 12/1987 | Skeels et al. | 423/328 |
| 4,753,910 | 6/1988 | Han et al. | 423/715 |
| 4,840,929 | 6/1989 | Chen et al. | 502/74 |
| 4,933,161 | 6/1990 | Vaughan et al. | 423/713 |
| 4,954,243 | 9/1990 | Kuehl et al. | 502/77 |
| 4,996,034 | 2/1991 | Skeels | 502/83 |
| 5,023,066 | 6/1991 | Gimpel et al. | 423/713 |
| 5,047,139 | 9/1991 | Gortsema et al. | 502/79 |
| 5,100,644 | 3/1992 | Skeels et al. | 502/85 |
| 5,242,677 | 9/1993 | Cooper et al. | 502/85 |
| 5,262,141 | 11/1993 | Skeels | 502/79 |

FOREIGN PATENT DOCUMENTS

| | | | |
|---|---|---|---|
| 0072397 | 2/1983 | European Pat. Off. | 502/64 |
| 0244056 | 11/1987 | European Pat. Off. | 502/64 |
| 1061847 | 3/1967 | United Kingdom | 502/64 |

OTHER PUBLICATIONS

Fejes et al. "A Novel Method for the Dealumination of Zeolites" *React. Kinet. Catal. Lett.*, vol. 14, No. 4 481–488 (1980) (no month).

D. Breck, "Ion Exchange Reactions in Zeolites", *The Zeolite Molecular Sieves* (7) 529–555 (A Wiley-Interscience Publication 1974) (no month).

*Primary Examiner*—Mark L. Bell
*Assistant Examiner*—David Sample
*Attorney, Agent, or Firm*—Panitch Schwarze Jacobs & Nadel

[57] ABSTRACT

A process for the manufacture of a modified aluminosilicate zeolite is disclosed which includes contacting a starting zeolite in an aqueous phase with a dealuminating agent at a pH value of lower than 4 in the presence of a soluble silica. A novel zeolite composition is also disclosed which has increased acid and thermal stability.

7 Claims, 2 Drawing Sheets

○ SAI-1 (Inventive Example 2)
▲ Starting material NaY
□ Zeolite-LY (Comparative Example 4)

MODIFIED CRYSTALLINE ALUMINOSILICATE ZEOLITES AND PROCESS FOR THEIR PREPARATION

CROSS REFERENCE TO RELATED APPLICATION

This application is a continuation of U.S. patent application Ser. No. 07/965,479, filed Oct. 23, 1992, now abandoned, which is a continuation-in-part of U.S. patent application Ser. No. 07/680,465, for "Modified Crystalline Aluminosilicate Zeolites and Process for Their Preparation", filed Apr. 4, 1991, now abandoned.

BACKGROUND OF THE INVENTION

1. Field of the Invention

This invention relates to a modified crystalline aluminosilicate zeolite and a process of making the same.

2. Prior Art

There are known a variety of zeolites, of which the so-called ultrastable Type Y zeolites have become widely acclaimed for their commerical value.

A typical example of the process for preparing such zeolite compositions is disclosed in U.S. Pat. No. 3,929,672 which comprises calcining an ammonium-sodium Y zeolite containing about 0.6–5 weight-percent of sodium as $Na_2O$, said calcining being carried out at a temperature between about 600° and 1650° F. in contact with at least about 0.2 psi of water vapor for a sufficient time to substantially reduce the unit cell size of said zeolite and bring it to a value between about 24.40 and 24.64 Å; and subjecting the calcined zeolite to further ammonium ion exchange under conditions adjusted to replace at least about 25 percent of its residual zeolite sodium ions with ammonium ions and produce a final product containing less than about 1 weight-percent $Na_2O$.

Another prior art process is taught in U.S. Pat. No. 3,506,400 whose claim 1 reads on a process for increasing the silica/alumina mole ratio in the crystal lattice of a crystalline aluminosilicate zeolite of the molecular sieve type, which molecular sieve is at least partially in its hydrogen form, said process comprising in combination: treating said molecular sieve at an elevated temperature within the range of about 800° to 1500° F. in an atmosphere containing at least 2% water for a period of time sufficient to effect removal of at least some alumina tetrahedra from said molecular sieve crystal lattice, said alumina forming an amorphous phase in said molecular sieve; and then contacting the thus treated molecular sieve with an agent, selected from the group consisting of the dilute mineral acids and the organic acid chelating agents, selective for the removal of alumina, whereby an aluminosilicate zeolite molecular sieve is obtained having an enhanced silica/alumina mole ratio with at least substantial retention of the degree of crystallinity of said molecular sieve.

Because of the possibility of acid treatment of zeolites such as of faujasite type leading to the disruption of the crystalline structure of the zeolite, both of the above cited prior art processes rely on partial exchange of alkali metal in the zeolite with ammonium ions to somewhat enhance its hydrothermal stability and on steam calcination to reduce the unit cell size of the zeolite thereby providing increased stability to acids and heat, followed by dealumination to provide greater $SiO_2/Al_2O_3$ ratios. It was further necessary after calcination to again subject the zeolite to exchange with ammonium ions so as to achieve sufficient reduction of its alkali metal ions. These steps of treatment add up to time-consuming and costly manufacture of the intended ultrastable zeolites. The prior processes have a further drawback in that the resultant zeolites have somewhat defective crystal structure and insufficient thermal stability due to the lack of positive silicon supply to the sites of the structure which have been dealuminated.

Improved processes have been proposed for the manufacture of modified zeolites rendered relatively free of structural defects or degradation by replacing aluminum ions with silicon ions. One such process is disclosed in EP-0,072,397 in which the zeolite is subjected to gas-phase reaction with gaseous halogenated silane. This compound is highly reactive with water and easily polymerizable per se and therefore difficult to handle. Another such process is shown in U.S. Pat. No. 4,711,770 in which the zeolite is treated in an aqueous phase with fluorosilicate. Still another such process is taught in EP-0,244,056 which employs for example ammonium hydrogen fluoride ($NH_4.HF$) as a fluoride ion source. These two processes commonly use fluorine compounds which tend to produce hydrogen fluoride in the reaction system. The presence of hydrogen fluoride poses a corrosion problem which demands installation of corrosion-proof manufacturing equipment and a further problem in that a starting zeolite if containing an alkali metal would suffer separation from cryolite ($Na_3AlF_6$).

SUMMARY OF THE INVENTION

With the foregoing difficulties of the prior art processes in view, the present invention seeks to provide a process of preparing such modified crystalline aluminosilicate zeolites at a relatively low cost which have sufficient acid stability and thermal stability to withstand elevated temperatures encountered typically in many catalyst systems for hydrocarbon conversion as well as for denitration to which the zeolite is applied.

According to one aspect of the invention, there is provided a process for the manufacture of modified crystalline aluminosilicate zeolites, which process is characterized by (i) reducing the unit cell size of the zeolite to provide increased silica/alumina ratios without resort to calcination; (ii) acid treatment of a starting zeolite relatively low in acid resistance such as a faujasite zeolite without disrupting or degrading its crystalline structure; (iii) direct removal of alkali metal in the zeolite without replacement with ammonium (however, the invention does not contemplate the exclusion of use of ammonium ion exchanged zeolites); and (iv) dealumination from the zeolite and introduction of silicon in solution into the zeolite crystal structure thereby affording enhanced thermal stability.

According to another aspect of the invention, there is provided a novel modified faujasite crystalline aluminosilicate zeolite composition which has a silica/alumina mole ratio of more than 6 and an ammonium ion exchange degree of more than 0.70 without having encountered a thermal history of above 150° C.

Briefly stated, the process of the invention comprises contacting a crystalline aluminosilicate zeolite in an aqueous phase with a dealuminating agent at a pH value of not exceeding 4 in the presence of a soluble silica.

The above and other advantages and features of the invention will appear clear from the following detailed description.

DETAILED DESCRIPTION OF THE INVENTION

Figure 1:
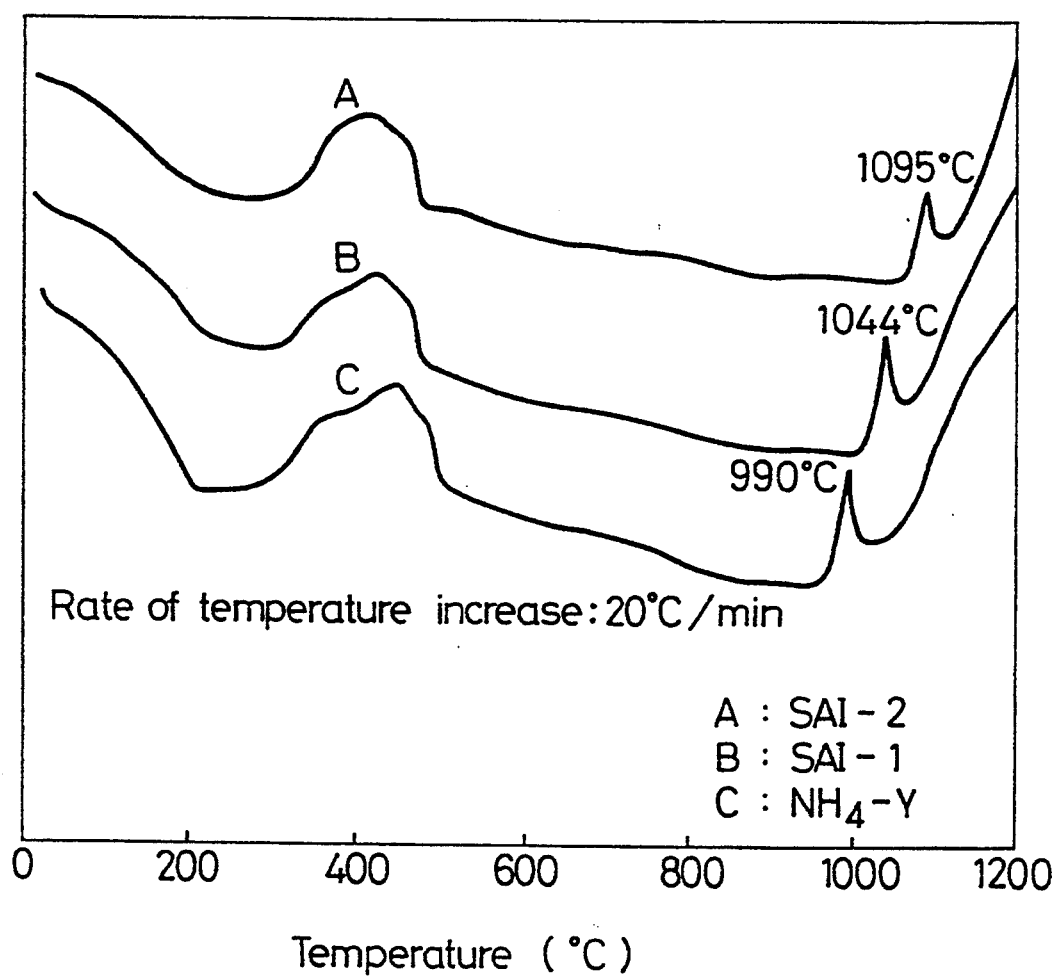
FIG. 1 graphically depicts the differential thermal analysis of 91% exchanged NH$_4$-Y and Inventive Examples 2 and 3 zeolites, respectively.

The term "crystalline aluminosilicate zeolite" is used to designate Type A, Type L, Type W, Type X, Type Y and Type ZSM zeolites as well as mordenite in the natural or synthesized form. Faujasite zeolites such as zeolite Y having silica/alumina mole ratios exceeding 3 are of particular value as catalytic materials for various processes including hydrocarbon conversion and isomerization. The starting zeolite contemplated by the invention may contain large proportions of alkali metal, or may be one having the alkali metal exchanged with ammonium ions, or one having aluminum removed from the crystal structure of the zeolite.

The term "soluble silica" is used herein to designate a silica which is capable of forming a yellowish molybdosilica upon reaction with ammonium molybdate in acidic aqueous solution of sulfuric acid. The soluble silica source includes silicic acid represented by $xSiO_2 \cdot yH_2O$ such as orthosilicic acid and methasilicic acid, silicate such as metasilicate, orthosilicate, disilicate and trisilicate, silica sol having highly polymerized silicic acid, silane compound and the like which may be soluble only appreciably. According to the invention, the soluble silica is present in an amount of not less than 130 ppm preferably not less than 450 ppm, more preferably 500 to 2500 ppm in an aqueous solution. Less soluble silica than 130 ppm in the aqueous solution would result in disrupted crystal structure of the zeolite upon acid treatment.

The dealuminating agent used in the invention includes mineral acids such as sulfuric acid, nitric acid and hydrochloric acid, an organic acid such as acetic acid and a chelating agent such as EDTA, of which sulfuric, nitric and hydrochloric acids are particularly preferred.

According to the invention, the starting zeolite is suspended in an aqueous phase in which a soluble silica is present and subsequently contacted slowly with a dealuminating agent at pH of lower than 4. More specifically, the zeolite is suspended in an aqueous solution containing small quantities of a soluble silica such as silicic acid and thereafter slowly added with a soluble silica source such as silicic acid and a dealuminating agent such as sulfuric acid with stirring at increased temperature thereby adjusting the suspension to pH below 4, followed by washing and drying to obtain a modified zeolite composition.

It is preferable to maintain the mole ratio of $SiO_2$ to zeolite in the aqueous phase in the range of 0.01 to 0.30 at the stage of adding the starting zeolite and in the range of 0.01 to 2.0 subject to variation depending on an intended silica/alumina ratio of the modified zeolite product, at the stage of adding an additional soluble silica along with the dealuminating agent. When the starting zeolite is brought into contact with an aqueous phase having less than 0.01 mole of $SiO_2$ per mole of zeolite, the zeolite crystal structure is susceptible to destruction, resulting in reduced crystallinity of the modified zeolite. When contacting of the starting zeolite with an aqueous phase having more than 0.30 moles of $SiO_2$ per mole of zeolite, this will induce deposition of silica on the zeolite suspended in the aqueous phase. The process of the invention contemplates that dealumination from the zeolite structure and the introduction of silicon into the zeolite structure take place in the aqueous phase in which soluble silica is supersaturated by slowly adding the additional soluble silica along with the dealuminating agent thereby obtaining the modified zeolite having sufficient crystallinity. Addition of the dealuminating agent should preferably be less than 0.2 moles, more preferably, less than 0.15 moles per hour per mole zeolite. The suspension temperature, though not critically limited, is preferably in the range of 50°–100° C.

With faujasite zeolite of relatively low acid stability having silica/alumina ratios of about 3–6 and a unit cell size of 24.65 Å or greater, the zeolite crystal structure is susceptible to disruption when their suspension pH is brought to less than 4. This tendency is pronounced with zeolites containing large proportions of alkali metal. Such zeolites therefore being not sufficiently dealuminated would be practically ineligible for a successful starting material.

According to the process of the invention, the dealumination or removal of alumina from the zeolite structure is effected concurrently with the introduction of silicon into the dealuminated sites so that the suspension pH can be held to well below 4, possibly even below 1 without causing disruption or degradation of the crystal structure of such a faujasite zeolite with low acid stability. Higher pH than 4 is undesirable because of inadequate dealumination from the zeolite structure. The starting zeolite should therefore be contacted with the dealuminating agent at pH less than 3, preferably, less than 2.

The alumina/silica mole ratio and the unit cell or lattice size in a modified zeolite of the invention can be effectively controlled by the amount of addition of the dealuminating agent which governs the amount of alumina removed from the crystal structure of the zeolite. With the starting faujasite zeolite, there can be obtained a modified zeolite having a silica/alumina mole ratio of above 6, preferably between 7 and 30 and a unit cell size adjusted to less than 24.65 Å, preferably to between 24.55 Å and 24.30 Å.

The present invention also provides a modified faujasite crystalline aluminosilicate zeolite composition having a silica/alumina mole ratio of more than 6; an ammonium ion exchange degree of more than 0.7 without having encountered a thermal history of above 150° C. and a crystallinity of at least 70%, preferably at least 85%, more preferably at least 90%. As used herein, the "thermal history" is defined to mean that the starting zeolite or the modified zeolite has not been subjected to calcination at a temperature above 150° C. As used herein, the "crystallinity" is defined to mean a relative value of the modified zeolite based on 100% crystallinity of the starting zeolite crystallinity.

The term "ammonium ion exchange degree", as used herein, is defined by Donald W. Breck in his article headed "Ion Exchange Reactions in Zeolites" in The Zeolite Molecular Sieves, Chapter Seven, A Wiley-Interscience Publication (1974). To obtain this value, experiments were conducted in which a sample faujasite zeolite without a thermal history of above 150° C. is suspended in ten-fold deionized water and the suspension was added with a salt (NaCl) in an amount corresponding to ten times the alumina moles (m) derived from the composition analysis of the zeolite sample, followed by heating up to 80° C. with stirring. At this temperature, 3.0 weight % NaOH solution was added to adjust the suspension to pH of 8.5 and the suspension was stirred for one hour, followed by heating to 90° C. and stirring for another thirty minutes. The resultant suspension was filtrated and washed with 80° C. water until there was obtained a zeolite composition in which sodium ion exchange was complete. The Na+ exchange zeolite was then suspended in ten-fold deionized water and then added with ammonium sulfate in an amount corresponding to five times the alumina moles (m) derived analytically from the starting zeolite composition, followed by heating up to 80° C. with stirring. The suspension at this temperature was stirred for one hour and thereafter filtrated, washed with 80° C. water and dried at 120° C. over twenty four hours until there was obtained an ammonium ion exchanged zeolite species (A).

The above same procedure was followed in preparing another ammonium ion exchanged zeolite species (B) except that sodium was replaced with ten times as much ammonium sulfate.

Figure 2:
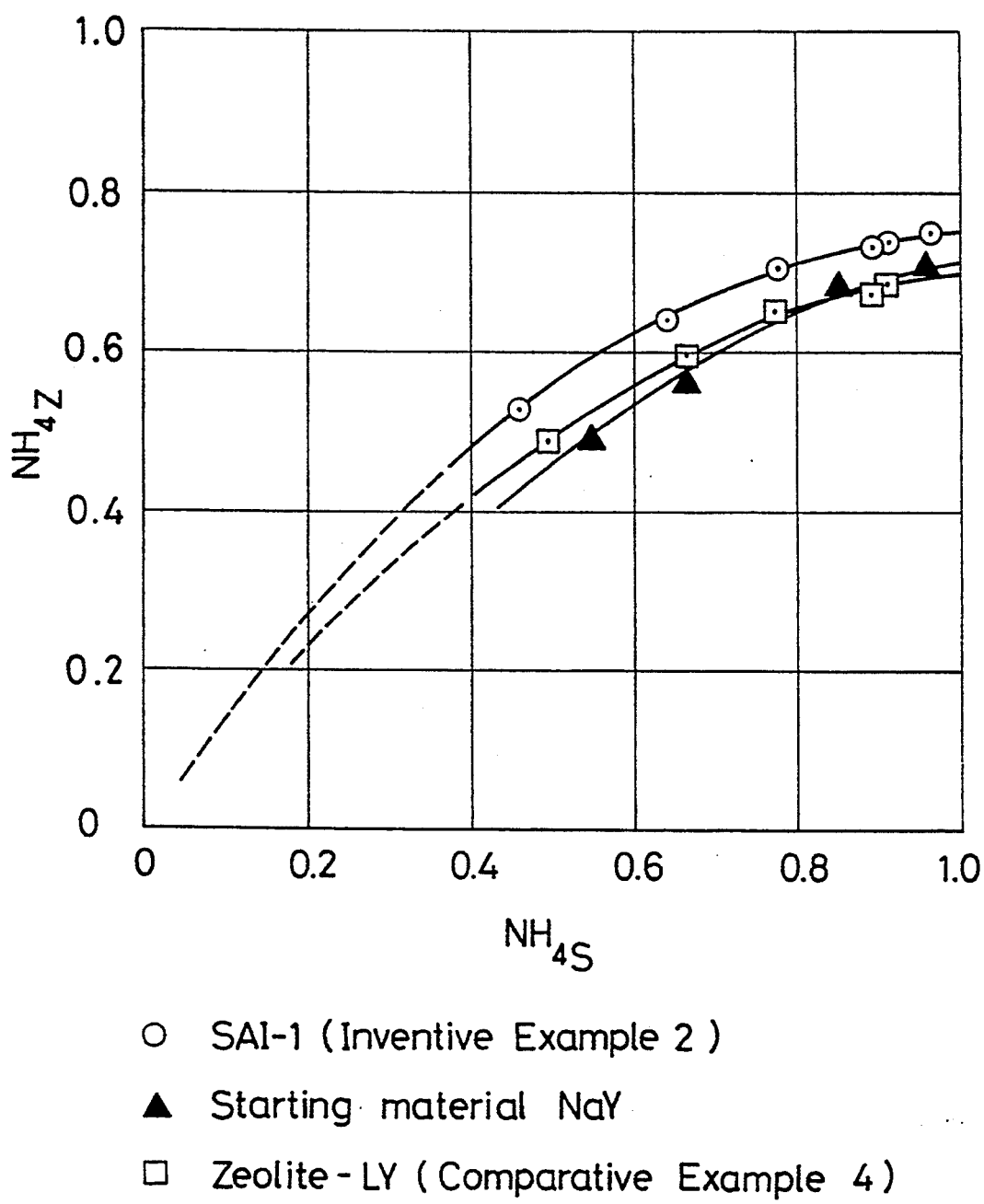
FIG. 2 graphically depicts the ion exchange isotherms of Inventive Example 2 zeolite and Comparative Example 4 zeolite, respectively.

The ammonium ion exchange degree (NH$_4$Z) according to the invention is derived from a graphical display in which the equivalent fractions of the exchanging ions NH$_4$+ in the solution (abscissa) are plotted against the equivalent fractions of the exchanging ions NH$_4$+ in the zeolite (ordinate) to draw an ion exchange isotherm at 80° C. based on the experimental data of the above two species (A) and (B), which isotherm represents an ammonium ion exchange degree in the zeolite at a value on the ordinate corresponding to a value of 0.9 on the abscissa. A typical example of such ion exchange isotherm is shown in FIG. 2.

The ammonium ion exchange degree (NH$_4$Z) for conventional faujasite zeolites such as Type Y zeolite which have no thermal history of above 150° C. is normally about 0.68. Generally, zeolites with lower silica/alumina ratios demonstrate a relatively high ammonium ion exchange degree, but those with such ratios above 5 can hardly reach beyond 0.70 as determined by the above noted method. What has heretofore been done therefore to increase the exchange degree is to repeatedly carry out the ammonium ion exchange or to calcine the zeolite at an elevated temperature of about 400°-700° C. and then effect the ammonium ion exchange.

It has now been found that ammonium ion exchange degrees of as high as 0.70, preferably 0.72 can be achieved with modified faujasite zeolite compositions free of a thermal history (above 150° C.) by contacting the zeolite with one or more of acids of the group consisting of sulfuric, nitric and hydrochloric acids at a pH value of less than 4 in the presence of a soluble silica of the character defined herein above. This is believed to be due to the fact that the unit cells forming the hexagonal prisms (site I) in the crystal structure of the zeolite, which are considered most difficult for ammonium ion exchange are preferentially dealuminated and silicon is then introduced into the dealuminated sites and further that the amount of aluminum in the unit cells against total alumina in the crystal structure is relatively small as compared to conventional faujasite zeolites.

It is known that the ratio of silica/alumina in the zeolite structure is intimately correlated to the unit cell size of the zeolite. The modified faujasite zeolite compositions of the invention have such a silica/alumina ratio of more than 6, preferably more than 7, more preferably more than 8.

The invention will be further described by way of the following examples.

Inventive Example I 464 grams of starting NaY zeolite Na$_2$O Al$_2$O$_3$ 5SiO$_2$ by mole composition) were suspended in 4640 cc of 80° C. water. To the resulting suspension were added 310 grams of a silicic acid solution prepared by dealkalizing a water glass (SiO$_2$/Na$_2$O=3, diluted in silica concentration to 1%) with an ion exchange resin. Sulfuric acid of 25% concentration was then added continuously at a rate of 67.5 cc per hour with stirring at 80° C. During this sulfuric acid addition, a small sample of zeolite was taken, washed, dried at 110° C. and subjected to crystallinity measurement by X-ray diffraction with the results indicated in Table 1 which shows the relationship between the amount of sulfuric acid added and the crystallinity of the zeolite.

Comparative Example 1

The procedure of Inventive Example 1 was followed except that the silicic acid solution was not added.

TABLE I

| Amount of H$_2$SO$_4$ (mole/mole zeolite) | Comparative Example 1 | | Inventive Example1 | |
|---|---|---|---|---|
| | pH/80° C. | crystallinity* | pH/80° C. | crystallinity* |
| 0 | 9.21 | 100 | 9.21 | 100 |
| 0.16 | 3.04 | 86 | 3.10 | 96 |
| 0.50 | 2.69 | 84 | 2.65 | 94 |
| 1.00 | 2.40 | 71 | 2.38 | 92 |
| 1.65 | 2.18 | 50 | 2.15 | 91 |
| 2.00 | 2.05 | 33 | 1.99 | 86 |
| 2.50 | 1.93 | 12 | 1.87 | 75 |
| 3.00 | 1.82 | 0 | 1.77 | 61 |

Note:
*Indicated is a relative value based on 100% crystallinity of starting NaY zeolite Inventive Example 2

464 grams of starting NaY zeolite (Na$_2$O.Al$_2$O$_3$.5SiO$_2$ by mole composition) were suspended in 4640 cc of 80° C. water. A water glass (SiO$_2$/Na$_2$O=3, diluted in silica concentration to 1%) was neutralized with sulfuric acid to prepare 4500 grams of silicic acid solution having a pH value of 2.0. 310 grams of this solution were added with stirring to the zeolite suspension and heated to 95° C. 4190 grams of the remaining silicic acid solution and 8820 grams of 2.5% sulfuric acid were continuously added at the rates of 83.8 grams per hour and 176.4 grams per hour, respectively, thereby adjusting the system to a pH of 2.0. Thereafter, the zeolite was separated, washed, dried and subjected to chemical composition analysis and further to X-ray diffraction to determine its crystallinity and unit cell size, with the results shown in Table 2. The resulting modified zeolite referred to as SAI-1 and starting NaY zeolite material were checked for their respective ammonium ion exchange properties by the ammonium ion exchange procedure already described to make them into respective Na+ ion exchanged zeolites with varied amounts of ammonium sulfate so as to obtain their respective ion exchange degrees as shown in FIG. 2.

In the ion exchanged isotherm of FIG. 2, the ordinate (NH$_4$Z) represents NH$_4$+ equivalent fractions of the total cation in the zeolite which are derived from the formula:

$$NH_4Z = \frac{NH_4^+}{Na^+ + NH_4^+ + H^+}$$

and the abscissa (NH4S) represents NH4+ equivalent fractions in the solution which are derived from the formula:

$$NH_4S = \frac{NH_4^+}{Na^+ + NH_4^+}$$

Quite clearly, the modified zeolite (SAI-1) has enhanced ion exchange property over the conventional NaY zeolite.

Inventive Example 3

464 grams of NaY zeolite (Na$_2$O.Al$_2$O$_3$.5SiO$_2$ by mole composition) were subjected to repeated ion exchange in a manner well known in the art thereby preparing an ammonium ion exchanged zeolite with 25% residual sodium ion. The zeolite was suspended in 4640 cc of 80° C. water. A water glass (SiO$_2$/Na$_2$O=3, diluted in silica concentration to 1%) was neutralized with sulfuric acid to prepare 5700 grams of silicic acid solution having a pH value of 2.0. 310 grams of this solution were added with stirring to the zeolite suspension and heated to 95° C. 5390 grams of the remaining silicic acid solution and 13720 grams of 2.5% sulfuric acid were added continuously over 50 hours at the rates of 107.8 grams per hour and 274.4 grams per hour, respectively, thereby adjusting the system to a pH of 1.8. Thereafter, the zeolite was separated, washed and dried thereby obtaining a modified zeolite SAI-2 whose properties are shown in Table 2.

Comparative Example 2

464 grams of NaY zeolite (Na$_2$O.Al$_2$O$_3$.5SiO$_2$ by mole composition) were repeatedly ion-exchanged to prepare an ammonium ion exchanged zeolite with 25% residual sodium ion. The zeolite was washed and dried, followed by calcination at 550° C. for 3 hours. The calcined zeolite was further exchanged with ammonium sulfate thereby to obtain NH4-Y zeolite having 91% ammonium ion exchanged and containing 1.33 weight % of Na$_2$O corresponding to zeolite C in FIG. 1. The resulting NH4-Y zeolite was compared in differential thermal analysis with the zeolites of Inventive Examples 2 and 3 as shown in the graph of FIG. 1. The rise and the fall in the curvature on the ordinate represent exothermic and endothermic, respectively. The curves A, B and C are neither superior nor inferior to one another on the ordinate and just are indicative of their respective peculiar exothermic and endothermic trends. The graph show the occurrence of disruption of the crystal structure for A at 1095° C., for B at 1044° C. and for C at 990° C., thus indicating superior thermal stability of the inventive modified zeolites compared to the conventional counterpart.

Inventive Example 4

464 grams of starting NaY zeolite (Na$_2$O.Al$_2$O$_3$.5SiO$_2$ by mole composition) were subjected to repeated ion exchange in the usual manner thereby preparing an ammonium ion exchanged zeolite with 25% residual sodium ion. The zeolite was suspended in 4640 cc of 80° C. water. Silica sol of 30% silica was diluted to 1% silica concentration to prepare 5700 grams of diluted silica sol. 310 grams of this sol were added with stirring to the zeolite suspension and heated to 95° C. 5390 grams of the remaining sol and 13720 grams of 2.5% sulfuric acid were added continuously at the rates of 53.9 grams per hour and 137.2 grams per hour, respectively, thereby adjusting the system in pH to 1.75. Thereafter, the zeolite was separated, washed, dried thereby obtaining a modified zeolite SAI-3 whose properties are shown in Table 2.

Inventive Example 5

The procedure of Inventive Example 3 was followed except that 10220 grams of 2.5% hydrochloric acid were added continuously over 50 hours at a rate of 204.4 grams per hour. The resulting modified zeolite is referred to as SAI-4 and its properties are shown in Table 2.

Inventive Example 6

The procedure of Inventive Example 3 was followed except that 17640 grams of 2.5% nitric acid were added continuously over 50 hours at a rate of 352.4 grams per hour. The resulting modified zeolite SAI-5 is identified in Table 2.

Inventive Example 7

464 grams of NaY zeolite (Na$_2$O.Al$_2$O$_3$.5SiO$_2$ by mole composition) were subjected to repeated ion exchange in the usual manner thereby preparing an ammonium ion exchanged zeolite with 25% residual sodium ion. The zeolite was suspended in 4640 cc of 80° C. water. A water glass (SiO$_2$/Na$_2$O=3, diluted in silica concentration to 1%) was neutralized with sulfuric aid to prepare 3000 grams of silicic acid solution having a pH value of 2.0. The whole of this solution was added with stirring to the zeolite suspension and heated to 95° C. 9800 grams of 2.5% sulfuric acid were then added continuously over 35.7 hours at a rate of 274.5 grams per hour thereby adjusting the system to a pH of 1.93. Thereafter, the zeolite was separated, washed and dried thereby obtaining a modified zeolite SAI-6 whose properties are shown in Table 2.

Inventive Example 8

464 grams of NaY zeolite (Na$_2$O.Al$_2$O$_3$.5SiO$_2$ by mole composition) were subjected to repeated ion exchange in the usual manner thereby preparing an ammonium ion exchanged zeolite with 25% residual sodium ion. The zeolite was suspended in 4640 cc of 80° C. water. A water glass (SiO$_2$/Na$_2$O=3, diluted in silica concentration to 1%) was neutralized with sulfuric aid to prepare 3000 grams of silicic acid solution having a pH value of 2.0. 1200 grams of this solution were added with stirring to the zeolite suspension and heated to 95° C. 1800 grams of the remaining silicic acid solution and 9800 grams of 2.5% sulfuric acid were added continuously over 37.5 hours at the rates of 50.4 grams per hour and 274.5 grams per hour, respectively, thereby adjusting the system to a pH of 1.92. Thereafter, the zeolite was separated, washed and dried thereby obtaining a modified zeolite SAI-7 whose properties are shown in Table 2.

Comparative Example 3

464 grams of starting NaY zeolite ($Na_2O.Al_2O_3.5SiO_2$ by mole composition) was suspended in 4640 cc of 80° C. water. To the zeolite suspension heated to 95° C. were continuously added 17538 grams of 1% ethylenediamine tetraacetate solution heated at 80° C. over 50 hours at a rate of 350.8 grams per hour thereby adjusting the system in pH to 3.8. Thereafter, the zeolite was separated, washed and dried thereby obtaining a dealuminated zeolite NaY EDTA shown in Table 2.

Comparative Example 4

A silicon substituted zeolite was prepared in accordance with the procedure described in Inventive Example 4 provided in the specification of U.S. Pat. No. 4,711,770, which is hereby incorporated by reference. 464 grams of NaY zeolite ($Na_2O.Al_2O_3.5SiO_2$ by mole composition) were subjected to repeated ion exchange in a well known manner thereby preparing an ammonium ion exchange zeolite having 25% residual sodium ion. The exchanged zeolite was heated to 75° C. and suspended in 3.5 mole ammonium acetate solution. To the resulting suspension was added 650 cc aqueous solution of 75° C. containing 120 grams $(NH_4)_2SiF_6$ at a rate of 4 cc per minute, followed by heating to 95° C. and ageing at this temperature for 17 hours. The suspension, which showed a pH of 6.2, was filtered, washed and dried to obtain zeolite LY-1. This zeolite was checked for its ammonium ion exchange property by means of the procedure of Inventive Example 2, with the results shown in FIG. 2 and other properties in Table 2.

Comparative Example 5

NaY zeolite ($Na_2O.Al_2O_3.5SiO_2$ by mole composition) was conventionally ion-exchanged to prepare an ammonium ion exchanged zeolite with 25% residual sodium ion. 10.9 grams of the resulting zeolite were mixed with 22 grams of silica sol having a $SiO_2$ content of 5.0% by weight, followed by drying at 110° C. thereby obtaining a silica bound zeolite. Crystallinity measurement by X-ray diffraction shows that crystallinity of the silica bound zeolite is 89% based on 100% crystallinity of NaY zeolite.

In a container made of Teflon, the silica bound zeolite was reacted with 301.5 grams of 0.2 M solution of ammonium hydrogen fluoride ($NH_4F.HF$). The pH of the reactant solution was 3.5. The container was covered, heated to 80° C., and allowed to react overnight. The reaction product was filtered, washed and dried thereby obtaining a modified zeolite FY-1. Crystallinity measurement by X-ray diffraction shows that crystallinity of the modified zeolite FY-1 is 38% and 42.7% based on 100% crystallinity of the starting NaY zeolite and 100% crystallinity of the silica bound zeolite, respectively.

Comparative Example 6

464 grams of NaY zeolite ($Na_2O.Al_2O_3.5SiO_2$ by mole composition) were subjected to repeated ion exchange in a conventional manner thereby preparing an ammonium ion exchanged zeolite with 25% residual sodium ion. In a container made of Teflon, the zeolite was suspended in 4640 cc of 80° C. water. A water glass ($SiO_2/Na_2O=3$, diluted in silica concentration to 1%) was neutralized with sulfuric aid to prepare 5700 grams of silicic acid solution having a pH value of 2.0. 310 grams of this solution were added with stirring to the zeolite suspension and heated to 95° C. Next 5390 grams of the remaining silicic acid solution and 14000 grams of 1.0% hydrofluoric acid were added continuously over 50 hours at the rates of 107.8 grams per hour and 280.0 grams per hour, respectively, thereby adjusting the system to a pH of 5.10. Thereafter, the zeolite was separated, washed and dried thereby obtaining a modified zeolite FY-2 whose properties are shown in Table 2.

Inventive Example 9

464 grams of NaY zeolite ($Na_2O.Al_2O_3.5SiO_2$ by mole composition) were subjected to repeated ion exchange in a manner well known in the art thereby preparing an ammonium ion exchanged zeolite with 25% residual sodium ion. The zeolite was suspended in 4640 cc of 80° C. water. A water glass ($SiO_2/Na_2O=3$, diluted in silica concentration to 1%) was neutralized with sulfuric aid to prepare 4800 grams of silicic acid solution having a pH value of 2.0 310 grams of this solution were added with stirring to the zeolite suspension and heated to 95° C. 4490 grams of the remaining silicic acid solution and 7840 grams of 2.5% sulfuric acid were added continuously at the rates of 187 grams per hour and 327 grams per hour, respectively.

A small amount of slurry was sampled each at intervals of 6 hours, 12 hours and 24 hours, respectively, following the addition of the above silicic acid solution and sulfuric acid. The resulting zeolites were separated, washed and dried thereby obtain respective modified zeolites SAI-8, SAI-9 and SAI-10 shown in Table 2.

Inventive Example 10

464 grams of NaY zeolite ($Na_2O.Al_2O_3.5SiO_2$ by mole composition) were subjected to repeated ion exchange in a manner well known in the art thereby preparing an ammonium ion exchanged zeolite with 25% residual sodium ion. The zeolite was suspended in 4640 cc of 80° C. water. A water glass ($SiO_2/Na_2O=3$, diluted in silica concentration to 1%) was neutralized with sulfuric aid to prepare 9000 grams of silicic acid solution having a pH value of 2.0. 310 grams of this solution were added with stirring to the zeolite suspension and heated to 95° C. 8390 grams of the remaining silicic acid solution and 17640 grams of 2.5% sulfuric acid were added continuously over 100 hours at the rate of 83.9 grams per hour and 176.4 grams per hour, respectively, thereby adjusting the system to pH of 1.58. Thereafter, the zeolite was separated, washed and dried thereby obtaining a modified zeolite SAI-11 whose properties are shown in Table 2.

Comparative Example 7

464 grams of NaY zeolite ($Na_2O.Al_2O_3.5SiO_2$) were subjected to repeated ion exchange in a conventional manner thereby preparing an ammonium ion exchanged zeolite with 16% residual sodium ion. The zeolite was suspended in 3.5 liters of an aqueous solution containing 943 grams of ammonium acetate and heated to 95° C. 3 liters of an aqueous solution containing 150 grams of ammonium silicofluoride were then added continuously over 48 hours at a rate of 62.5 cc per hour thereby adjusting the system to a pH of 6.02. Thereafter, the resulting mixture was subjected to ageing for 17 hours at 95° C. The zeolite was separated, washed and dried thereby obtaining a modified zeolite LY-2 whose properties are shown in Table 2.

It will be appreciated by those skilled in the art that changes could be made to the embodiments described above without departing from the broad invention concept thereof. It is understood, therefore, that this invention is not limited to the particular embodiment disclosed, but it is intended to cover modifications which are within the spirit and scope of the invention as defined by the appended claims.

2. A process according to claim 1 wherein said step (a) is effected by contacting said starting faujasite zeolite in said aqueous phase with said dealuminating agent at a pH value not exceeding 2 in the presence of said soluble silica.

TABLE 2

|  | Zeolite | final pH of suspension | crystallinity *1 (%) | unit cell size (Å) | chemical analysis (D.B. wt %) | | | SiO$_2$/Al$_2$O$_3$ (mole ratio) | ammonium ion exchange degree *2 |
|---|---|---|---|---|---|---|---|---|---|
|  |  |  |  |  | Na$_2$O | Al$_2$O$_3$ | SiO$_2$ |  |  |
| Control | NaY (starting material) | — | 100 | 24.67 | 13.36 | 21.98 | 64.66 | 5.0 | 0.69 |
| IE 2 | SAI-1 | 2.00 | 96 | 24.55 | 1.40 | 14.00 | 84.60 | 10.3 | 0.73 |
| IE 3 | SAI-2 | 1.80 | 100 | 24.44 | 0.44 | 9.30 | 90.30 | 16.5 | 0.77 |
| CE 2 | NH$_4$-Y | — | 100 | 24.67 | 1.33 | 24.37 | 74.36 | 5.2 | — |
| IE 4 | SAI-3 | 1.75 | 95 | 24.46 | 0.56 | 9.05 | 90.39 | 17.0 | 0.77 |
| IE 5 | SAI-4 | 1.55 | 100 | 24.43 | 0.42 | 8.90 | 90.68 | 17.3 | 0.77 |
| IE 6 | SAI-5 | 1.46 | 100 | 24.43 | 0.40 | 9.10 | 90.50 | 16.9 | 0.77 |
| IE 7 | SAI-6 | 1.93 | 88 | 24.50 | 1.06 | 14.52 | 84.42 | 9.9 | — |
| IE 8 | SAI-7 | 1.92 | 98 | 24.52 | 1.11 | 14.65 | 84.24 | 9.8 | — |
| CE 3 | NaY EDTA | 3.80 | 68 | 24.65 | 10.19 | 17.47 | 72.34 | 7.0 | 0.64 |
| CE 4 | LY-1 | 6.26 | 85 | 24.52 | 1.70 | 16.22 | 82.08 | 8.6 | 0.67 |
| CE 5 | FY-1 | 3.50 | 38 | — | — | — | — | — | — |
| CE 6 | FY-2 | 5.10 | 30 | 24.51 | 0.46 | 8.50 | 91.04 | 18.2 | — |
| IE 9 | SAI-8 | 2.55 | 100 | 24.64 | 3.71 | 21.82 | 74.46 | 5.8 | 0.69 |
|  | SAI-9 | 2.30 | 98 | 24.60 | 2.72 | 19.46 | 77.82 | 6.8 | 0.70 |
|  | SAI-10 | 1.93 | 98 | 24.58 | 2.11 | 18.29 | 79.60 | 7.4 | 0.73 |
| IE 10 | SAI-11 | 1.58 | 86 | 24.38 | 0.33 | 8.15 | 91.52 | 19.1 | 0.80 |
| CE 7 | LY-2 | 6.02 | 91 | 24.49 | 0.85 | 13.81 | 85.34 | 10.5 | 0.68 |

Note:
*1 Indicated is a relative value based on 100% crystallinity of starting NaY zeolite.
*2 Ammonium ion exchange degree of zeolite at NH$_4^+$ equivalent fraction in solution of 0.9 as appears in the isotherm of FIG. 2.

We claim:

1. A process for the manufacture of a modified crystalline aluminosilicate zeolite which comprises the steps of:
   (a) contacting a starting faujasite crystalline aluminosilicate zeolite having a crystalline lattice with a silica/alumina mole ratio of not more than 6 and a unit cell size of 24.65 Å or greater in an aqueous phase with a dealuminating agent selected from the group consisting of sulfuric acid, nitric acid and hydrochloric acid at a pH value not exceeding 4 in the presence of a soluble silica in an amount of not less than 500 ppm, said soluble silica being derived from a soluble silica source selected from the group consisting of silicic acid, metasilicate, orthosilicate, disilicate, trisilicate and silica sol; and
   (b) recovering a modified faujasite crystalline aluminosilicate zeolite wherein a portion of the aluminum from the zeolite crystal structure has been replaced with silicon, such that the recovered zeolite has a silica/alumina mole ratio of more than 6 and a crystallinity of at least 70% relative to that of said starting zeolite.

3. A process according to claim 1 wherein said step (a) is effected by suspending said starting faujasite zeolite in said aqueous phase so as to maintain a mole ratio of SiO$_2$ to zeolite in the range of 0.01 to 0.30 and thereafter slowly adding said soluble silica in an amount of 0.01 to 2.0 mole of SiO$_2$ per mole of zeolite along with said dealuminating agent.

4. A process according to claim 2, wherein said step (a) is effected by suspending said starting faujasite zeolite in said aqueous phase so as to maintain a mole ratio of SiO$_2$ to zeolite in the range of 0.01 to 0.30 and thereafter slowly adding said soluble silica in an amount of 0.01 to 2.0 mole of SiO$_2$ per mole of zeolite along with said dealuminating agent.

5. A process according to claim 2 wherein said dealuminating agent is added at a rate of less than 0.2 moles per hour per mole of zeolite suspended in said aqueous phase.

6. A process according to claim 1 wherein said starting faujasite zeolite comprises an ammonium-sodium Y zeolite.

7. A process according to claim 1 wherein said starting faujasite zeolite comprises a sodium Y zeolite.

* * * * *